US012045866B2

United States Patent
Nuta et al.

(10) Patent No.: US 12,045,866 B2
(45) Date of Patent: *Jul. 23, 2024

(54) SYSTEM AND METHOD FOR PRESENTING TIRE-RELATED INFORMATION TO CUSTOMERS

(71) Applicant: Walmart Apollo, LLC, Bentonville, AR (US)

(72) Inventors: Christopher Nuta, Bentonville, AR (US); David M. Nelms, Rogers, AR (US); Suchitra Vakkalagadda, Bentonville, AR (US); Chandan Sharma, Castro Valley, CA (US); John Evankovich, Bentonville, AR (US); Kent Hobson, Bentonville, AR (US); Michael Clayton Patrick, Bentonville, AR (US); Ayan Akbar, San Mateo, CA (US); Rohini Panjrath, Mountain View, CA (US); Sreenivasa R. Kota, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/158,525

(22) Filed: May 12, 2023

(65) Prior Publication Data
US 2024/0070748 A1 Feb. 29, 2024

Related U.S. Application Data

(63) Continuation of application No. 17/543,860, filed on Dec. 7, 2021, now Pat. No. 11,580,587, which is a
(Continued)

(51) Int. Cl.
*G06Q 10/06* (2023.01)
*B64C 39/02* (2023.01)
(Continued)

(52) U.S. Cl.
CPC ....... *G06Q 30/0631* (2013.01); *B64C 39/024* (2013.01); *G06F 16/24578* (2019.01);
(Continued)

(58) Field of Classification Search
None
See application file for complete search history.

(56) References Cited

U.S. PATENT DOCUMENTS 7,386,565 B1 * 6/2008 Singh ................ G06F 16/24556
707/999.102
8,880,998 B2 11/2014 Jerome
(Continued)

FOREIGN PATENT DOCUMENTS

WO 2018005834 1/2018

OTHER PUBLICATIONS

Maria "A Knowledge-Based Approach Toward Integrating International On-Line Databases", Mar. 1989, Massachusetts Institute of Technology, pp. 1-111. (Year: 1989).*
(Continued)

*Primary Examiner* — Romain Jeanty
(74) *Attorney, Agent, or Firm* — Foley IP Law, PLLC

(57) ABSTRACT

A cloud-based system for use by retail store employees or customers at any location to facilitate the sale of automotive tires to consumers is provided. The system accesses multiple independent tire inventory systems from different distributors/manufacturers and provides a personalized set of recommendation tire options and accompanying TPMS service packs.

20 Claims, 7 Drawing Sheets

Related U.S. Application Data continuation of application No. 16/885,843, filed on May 28, 2020, now abandoned.

(60) Provisional application No. 62/854,144, filed on May 29, 2019.

(51) Int. Cl.

| | |
|---|---|
| *G06F 16/2457* | (2019.01) |
| *G06F 16/9535* | (2019.01) |
| *G06N 5/04* | (2023.01) |
| *G06Q 10/0631* | (2023.01) |
| *G06Q 10/087* | (2023.01) |
| *G06Q 30/0282* | (2023.01) |
| *G06Q 30/0601* | (2023.01) |
| *G06T 7/00* | (2017.01) |
| *H04L 9/40* | (2022.01) |
| *B64U 101/00* | (2023.01) |
| *G06Q 10/0639* | (2023.01) |
| *H04L 67/10* | (2022.01) |

(52) U.S. Cl.
CPC ........... *G06F 16/9535* (2019.01); *G06N 5/04* (2013.01); *G06Q 10/06311* (2013.01); *G06Q 10/087* (2013.01); *G06Q 30/0282* (2013.01); *G06Q 30/0627* (2013.01); *G06Q 30/0629* (2013.01); *G06Q 30/0633* (2013.01); *G06T 7/0002* (2013.01); *H04L 63/08* (2013.01); *B64U 2101/00* (2023.01); *G06Q 10/06395* (2013.01); *G06T 2207/30252* (2013.01); *H04L 67/10* (2013.01)

(56) References Cited

U.S. PATENT DOCUMENTS

| | | | |
|---|---|---|---|
| 9,365,188 B1 | 6/2016 | Penilla | |
| 9,493,130 B2 * | 11/2016 | Penilla | ................... G10L 25/63 |
| 10,424,129 B2 | 9/2019 | Laskey | |
| 10,657,739 B2 | 5/2020 | Mader | |
| 10,943,283 B2 | 3/2021 | Mattern | |
| 11,580,587 B2 | 2/2023 | Nuta | |
| 11,734,652 B2 * | 8/2023 | Hsu | ................ G06Q 30/0633 |
| | | | 705/26.8 |
| 11,781,884 B2 * | 10/2023 | Sumikawa | ............ B60C 23/067 |
| | | | 73/1.79 |
| 2002/0099701 A1 * | 7/2002 | Rippich | ............. G06F 16/9032 |
| | | | 707/999.005 |
| 2008/0065516 A1 | 3/2008 | Raju | |
| 2011/0153459 A1 | 6/2011 | Kirian | |
| 2013/0159201 A1 | 6/2013 | Kirian | |
| 2013/0204655 A1 | 8/2013 | Damon | |
| 2013/0218614 A1 | 8/2013 | Weinstock | |
| 2013/0325541 A1 | 12/2013 | Capriotti | |
| 2016/0232565 A1 | 8/2016 | Goergen | |
| 2020/0380582 A1 | 12/2020 | Nuta | |
| 2022/0092674 A1 | 3/2022 | Nuta | |

OTHER PUBLICATIONS

Tire Intelligence; "Manufacturers—Tire Intelligence"; http://tire-intelligence.com/index.php/tiremanufacturers/; available at least as early as May 2019; pp. 1-7.

Total Auto Business Solutions, Inc .; "AutoFluent™ for Tire and Wheel Dealers"; https://autorepairsoftware.com/tire-and-wheel-dealers; available at least as early as May 2019; pp. 1-2.

Tyresoft; "Sell tyres and services online with Tyresoft's simple ecommerce plugin"; http://tyresoft.co.uk/blog/index.php/ecommerce/; available at least as early as May 2019; pp. 1-4.

Tyresoft; "Welcome to Tyresoft"; https://www.tyresoft.co.uk/; available at least as early as May 2019; pp. 1-7.

U.S. Appl. No. 16/885,843; Notice of Allowance mailed Sep. 10, 2021; (pp. 1-12).

U.S. Appl. No. 17/543,860; Notice of Allowance and Fees Due (PTOL-85) mailed Oct. 19, 2022; (pp. 1-13).

\* cited by examiner

| | Selected Responsiveness | Most Important Wet | Not Selected Winter | Selected Comfort | Not Selected Offroad | Selected Mileage | Score |
|---|---|---|---|---|---|---|---|
| Tire Line 11 | 4 | 12 | 0 | 5 | 0 | 4 | 25 |
| Tire Line 20 | 1 | 15 | 0 | 4 | 0 | 5 | 25 |
| Tire Line 24 | 4 | 12 | 0 | 2 | 0 | 5 | 23 |
| Tire Line 10 | 5 | 12 | 0 | 4 | 0 | 1 | 22 |
| Tire Line 3 | 5 | 9 | 0 | 3 | 0 | 4 | 21 |
| Tire Line 1 | 5 | 12 | 0 | 2 | 0 | 1 | 20 |
| Tire Line 7 | 3 | 9 | 0 | 3 | 0 | 3 | 18 |
| Tire Line 6 | 1 | 15 | 0 | 2 | 0 | 0 | 18 |
| Tire Line 16 | 3 | 6 | 0 | 3 | 0 | 4 | 16 |
| Tire Line 12 | 1 | 12 | 0 | 1 | 0 | 1 | 15 |
| Tire Line 14 | 2 | 9 | 0 | 0 | 0 | 3 | 14 |
| Tire Line 17 | 0 | 9 | 0 | 2 | 0 | 3 | 14 |
| Tire Line 22 | 3 | 6 | 0 | 2 | 0 | 3 | 14 |
| Tire Line 23 | 3 | 3 | 0 | 4 | 0 | 3 | 13 |
| Tire Line 25 | 4 | 3 | 0 | 4 | 0 | 2 | 13 |
| Tire Line 15 | 5 | 3 | 0 | 1 | 0 | 3 | 12 |
| Tire Line 8 | 3 | 6 | 0 | 2 | 0 | 0 | 11 |
| Tire Line 21 | 3 | 3 | 0 | 4 | 0 | 1 | 11 |
| Tire Line 2 | 1 | 3 | 0 | 3 | 0 | 3 | 10 |
| Tire Line 19 | 4 | 0 | 0 | 4 | 0 | 1 | 9 |
| Tire Line 13 | 1 | 0 | 0 | 3 | 0 | 4 | 8 |
| Tire Line 5 | 2 | 0 | 0 | 4 | 0 | 1 | 7 |
| Tire Line 9 | 1 | 3 | 0 | 0 | 0 | 2 | 6 |
| Tire Line 18 | 1 | 0 | 0 | 2 | 0 | 1 | 4 |
| Tire Line 4 | 1 | 0 | 0 | 1 | 0 | 0 | 2 |

*FIG. 3A*

SYSTEM AND METHOD FOR PRESENTING TIRE-RELATED INFORMATION TO CUSTOMERS

CROSS REFERENCE TO RELATED APPLICATIONS

This application is a continuation of U.S. application Ser. No. 17/543,860, filed Dec. 7, 2021, which is a continuation of U.S. application Ser. No. 16/885,843, filed May 28, 2020, which claims the benefit of U.S. Provisional Application No. 62/854,144, filed May 29, 2019, all of which are incorporated herein by reference in their entireties.

TECHNICAL FIELD

These teachings relate to approaches for providing tire recommendations to customer in retail stores.

BACKGROUND

Traditionally, with products such as tires, the industry is segmented into tightly controlled product inventories and distribution chain systems such that a retailer usually sells products through distributors from only a limited number of manufacturers. A sales associate must run a separate query for products and availability in each of the separate inventory systems. For example, if a customer is interested in getting the best option available across multiple manufacturers, the customer must wait for the sale associate to run the query in each of the different distribution systems and must rely on the knowledge of the sale associate to select between the available options.

Often, due to the time involved to access multiple systems, the sales associates simply search the inventory database they are most familiar with, is easiest to use, or is required to use by the retailer. Thus, the consumer is presented search results from only that one manufacturer.

TPMS systems have been required by law since 2008. TPMS components such as TPMS service packs do not need to be replaced every time tires are changed, but do occasionally wear and need to be replaced. Since there are few guidelines controlling TPMS systems, it is difficult to determine exactly what service pack is needed for a particular make and model car. For example, the same year, make and model car could use any number of incompatible service packs. Incompatible service packs will not work properly and provide inaccurate tire pressure readings.

BRIEF DESCRIPTION OF THE DRAWINGS

The above needs are at least partially met through the provision of approaches for determining recommendations related to tires for customers, wherein:

FIGS. 3A and 3B comprise diagrams of aspects of a system as configured in accordance with various embodiments of these teachings;

DETAILED DESCRIPTION

Figure 1:
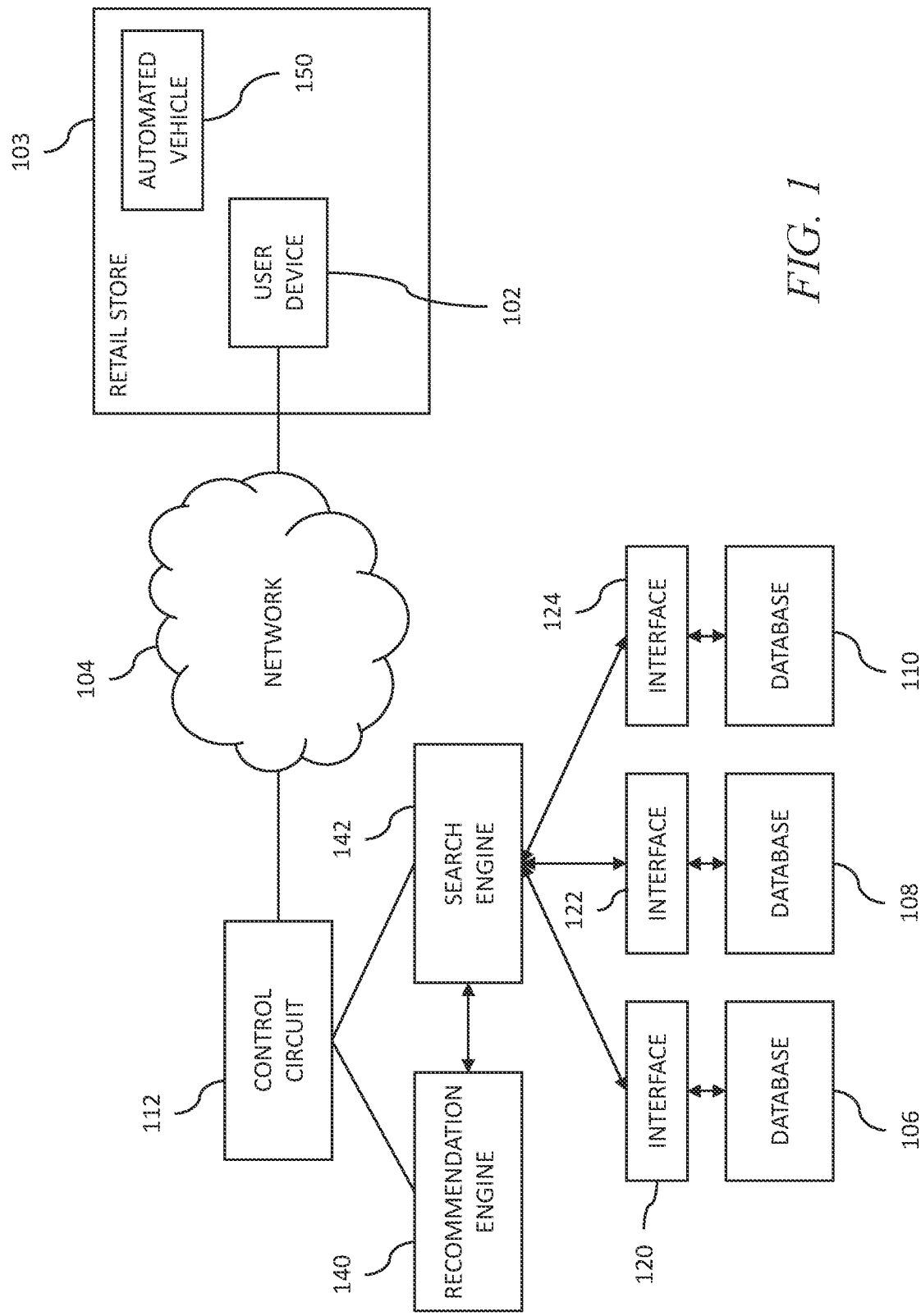
FIG. 1 comprises a diagram of a system as configured in accordance with various embodiments of these teachings.

Generally speaking, the present approaches generally relate to a cloud-based system for use by retail store employees at any location to facilitate the sale of automotive tires to consumers, where the system accesses multiple independent tire inventory systems from different distributors/manufacturers and provides a personalized set of recommendation tire options. In aspects, accompanying or related TPMS service packs may also be provided.

The system includes a single sales associate interface to centralize running product queries into each of multiple tire inventory databases that are independent of each other. For example, products and availability for Brand A tires are available only through a query into Brand A distribution database, and products and availability for Brand B tires are available only through a query into the Brands B distribution database, products and availability for the retailer's own branded tires are available only through a query into that retailer's distribution database.

The invention provides a backend interface to each of the multiple tire inventory databases. In aspects, a single query is run into one distribution system that will output products and availability for all types of tires. The system includes a recommendation engine to process parameters input by the sale associate and the results from the queries into the multiple tire inventory databases to make personalized product recommendations for the sale associate to suggest to the consumer. In one variation, the system can reliably provide additional recommendations for tire pressure monitoring systems (TPMS) components, such as TPMS service packs, that are compatible with the tires being recommended.

The concepts provide a system that can access each of the multiple distribution databases with one set of input from the sales associate and from the viewpoint of the sales associate, a single query is run. The backend of the system takes the user input and formats separate queries into each of the available inventory databases. Based on customer input as provided by the sales associates, a recommendation engine will prioritize the returned search results in order of the customer input to provide a personalized set of results. Input data includes objective data such as: vehicle year, make and model, existing tire size, and type. The input data also includes subjective data such as: user selections regarding the six main characteristics of tires: (1) responsiveness, (2) wet road performance, (3) winter road performance, (4) comfort, (5) off-road performance, and (6) mileage. For example, the user is able to indicate which is these characteristics is important and which is the most important. Each characteristic is rated by the manufacturer to a numerical value. Based on the user selections, a personalized set of search results across manufacturers is provided to the sales associate to present to the consumer.

The system can also recommend TPMS components to accompany the tire sale. With the VIN, the recommendation engine can query and find the correct TPMS service pack (e.g., a single pack). In other aspects, TPMS service packs associated with particular tires can be presented to customers along with the recommendations for these tires.

In a practical implementation, the front-end user interface is iOS based and runs as an application on an iPad tablet to be operated by sale associates of the retailer. This allows the associate to input all data needed and displays personalized search results for presentation to consumers. The main functions of the system including the engine to format and run the query across the multiple databases, the recommendation engine and the backend interface are implemented on cloud-based servers, e.g., using the Microsoft Azure™ cloud computing platform. The cloud platform accesses retailer databases to provide customer data, vehicle information databases to access vehicle information and third-party product inventory distribution databases.

In many of these embodiments, a system includes a user electronic device, an electronic network, a first database, a second database, and a control circuit. The user electronic device is operated in a retail store by an employee of the retail store. The first database is accessible by a first query made according to a first interface and using first security credentials, and the first database is coupled to the electronic network. The second database is accessible by a second query made according to a second interface and using second security credentials. The second database is coupled to the electronic network.

The first interface and the second interface are different and not compatible, and the first security credentials and the second security credentials are different and not compatible.

The control circuit is configured to execute a search engine and execute a recommendation engine. The control circuit is coupled to the electronic network, the first database, and the second database. The user electronic device is configured to receive vehicle information and tire ranking information from a customer relating to a vehicle of the customer.

The search engine is configured to: receive the vehicle information, map the vehicle information into a tire type, the tire type being compatible with the vehicle of the customer, create the first query for application to the first database and the second query for application to the second database. The first query and the second query include the tire type, and the first query is customized to access the first database and the second query is customized to access the second database.

The first query is applied to the first database by the search engine and the second query is applied to the second database by the search engine. The application of the first query returns first results to the search engine and application of the second query returns second results to the search engine and wherein the first results and second results are merged by the search engine into overall results and the overall results are sent to the recommendation engine.

The recommendation engine is configured to receive the ranking information from the user electronic device, sort the overall results received from the search engine according to the ranking information to create ranked results, and transmit the ranked results to the user electronic device. The user electronic device renders the ranked results on a display screen of the user electronic device. A further action is taken with respect to the ranked results. The further action is one or more of: ordering a tire using an electronic ordering system, instructing an automated vehicle to retrieve a tire from a storeroom, or instructing a robot or human to install a tire on a vehicle.

In aspects, the system additionally includes a third database. The third database includes tire pressure monitoring system (TPMS) data relating vehicle types to TPMS-related products. The employee enters tire pressure monitoring system (TPMS) business rules at the user electronic device. The TPMS business rules are applied to data in the third database by the recommendation engine to create a mapping between vehicle types and the TPMS-related products. The vehicle information is applied to the mapping to obtain a part number of a single TPMS-related product (or small group of products, e.g., three or less) suitable for the vehicle of the customer.

In aspects, the TPMS-related product is related to a valve stem. In other aspects, the user electronic device renders information concerning the single TPMS-related product on a display screen on the user electronic device. A further action is taken with respect to the single TPMS-related product, and the further action is one or more of: ordering the single TPMS-related product using the electronic ordering system, instructing an automated vehicle to retrieve the single TPMS-related product from a storeroom, or instructing a robot or human to install the single TPMS-related product on a vehicle.

In examples, the vehicle information comprises one or more of: the VIN number of the vehicle, the manufacturer of the vehicle, the model of the vehicle, and the year of the vehicle. Other examples are possible.

In other examples, the ranking information comprises one or more of: comfort performance, off-road performance, mileage performance, winter performance, responsiveness performance, and wet-road performance. Other examples are possible.

In examples, the automated vehicle is an automated ground vehicle or an aerial drone. Other examples are possible.

In yet other examples, the first interface and the second interface relate to requirements to one or more of: query formatting, query content, query length, and query timing. Other examples are possible.

In other examples, the system includes a sensor. The sensor is moved about a perimeter of the vehicle prior to the vehicle being serviced and obtains images that are used to determine whether the vehicle has pre-existing damage prior to being serviced. In aspects, the sensor is a camera in a portable electronic device carried by the employee about the perimeter of the vehicle. Other examples are possible.

In others of these embodiments, a user electronic device is provided, the user electronic device is operated in a retail store by an employee of the retail store. An electronic network and a first database are provided. The first database is accessible by a first query made according to a first interface and using first security credentials. The first database is coupled to the electronic network, and a second database. The second database is accessible by a second query made according to a second interface and using second security credentials. The second database is coupled to the electronic network. The first interface and the second interface are different and not compatible, and the first security credentials and the second security credentials are different and not compatible.

A control circuit is also provided. The control circuit is configured to execute a search engine and execute a recommendation engine.

At the user electronic device, vehicle information and tire ranking information from a customer relating to a vehicle of the customer is received. At the search engine, the vehicle information is received, the vehicle information is mapped into a tire type, the tire type being compatible with the vehicle of the customer, and the first query for application to the first database and the second query for application to the second database are created. The first query and the second query include the tire type. The first query is customized to access the first database and the second query is customized to access the second database. The first query is applied to the first database and the second query is applied to the second database. Application of the first query returns first results to the search engine and application of the second query returns second results to the search engine and wherein the first results and second results are merged by the search engine into overall results and the overall results are sent to the recommendation engine.

At the recommendation engine, the ranking information is received from the user electronic device. The overall results received from the search engine are sorted according to the ranking information to create ranked results, and the ranked results are transmitted to the user electronic device.

At the user electronic device, the ranked results are rendered on a display screen of the user electronic device. A further action is taken with respect to the ranked results, and the further action is one or more of: ordering a tire using an electronic ordering system, instructing an automated vehicle to retrieve a tire from a storeroom, or instructing a robot or human to install a tire on a vehicle.

Referring now to FIG. 1, one example of a system 100 for presenting tire related purchase recommendations to customers is described. The system 100 includes a user electronic device 102, an electronic network 104, a first database 106, a second database 108, a third database 110, and a control circuit 112.

The user electronic device 102 is any type of user electronic device such as a smartphone, personal computer, laptop, or tablet. Other examples of electronic devices are possible. The user electronic device 102 is operated in a retail store 103 by an employee of the retail store 103. The retail store 103 may be any type of retail store with shelving units, other display units, point-of-sales devices, and so forth. The electronic network 104 is any type of electronic communication network such as the internet, a wireless network, a cellular network, or any other electronic network or combination of networks. The employee may obtain information from a customer and enter this information (e.g., preferences) into the electronic device 102. In other examples, the customer operates their own electronic device (in the store 103 or outside the store 103) or an in-store electronic device without the aid or intervention of an employee.

The first database 106, second database 108, and third database 110 are any type of electronic memory storage units. The first database 106 is accessible by first queries made according to a first interface 120 and using first security credentials (e.g., security codes or passwords). In aspects, the first queries have a first predetermined format and include various types of information (e.g., security credentials). The first queries may be created by the control circuit 112 according to the requirements or format of the interface 120 or database 106. The first database 106 is coupled directly or indirectly (via interfaces and the control circuit 112) to the electronic network 104.

The second database 108 is accessible by second queries made according to a second interface 122 and using second security credentials (e.g., security codes or passwords that are different from the first security credentials). In aspects, the second queries have a second predetermined format and include various types of information (e.g., security credentials). The second queries may be created by the control circuit 112 according to the requirements or format of the interface 122 or the database 108. The second database 108 is coupled directly or indirectly (via interfaces and the control circuit 112) to the electronic network 104.

The third database 110 is accessible by third queries made according to a third interface 120 and using third security credentials (e.g., security codes or passwords). In aspects, the third queries have a third predetermined format and include various types of information (e.g., security credentials). The third queries may be created by the control circuit 112 according to the requirements or format of the interface 124 or the database 110. The third database 110 is coupled directly or indirectly (via interfaces and the control circuit 112) to the electronic network 104.

The first interface 120, the second interface 122, and the third interface 124 are any combination of hardware or software elements. The first interface 120, the second interface 122, and the third interface 124 allow or provide access to the first database 106, the second database 108, and the third database 110, respectively. The first interface 120, the second interface 122, and the third interface 124 map the queries to electronic instructions or commands that access and/or retrieve information from the databases 106, 108, and 110. In other aspects, the first interface 120, the second interface 122, and the third interface 124 relate to requirements regarding query formatting, query content, query length, and query timing. Other examples are possible.

The first interface 120, the second interface 122, the third interface 124 are different and not compatible (e.g., they expect to receive different types of queries having, for instance different formats and information), and the first security credentials, the second security credentials, and the third security credentials are different and not compatible. The third interface 124 is coupled to the third database 110. In aspects, the third database is different from the first database 106 and the second database 108. Put another way, the first queries cannot be used and would not be able to access the second database 108 and the third database 110. The second queries cannot be used and would not be able to access the first database 106 and the third database 110. The third queries cannot be used and would not be able to access the second database 108 and the first database 106.

It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 112 may be configured (for example, by using corresponding programming stored in a memory as will be well understood by those skilled in the art) to carry out one or more of the steps, actions, and/or functions described herein.

The control circuit 112 is configured to execute a search engine 140 and execute a recommendation engine 142. In aspects, the search engine 140 and the recommendation engine 142 are implemented as computer instructions, although they may be implemented as any combination of hardware and software elements.

The control circuit 112 is coupled to the electronic network 104, the first database 106, the second database 108, and the third database 110. The user electronic device 102 is configured to receive vehicle information and tire ranking information from a customer relating to a vehicle of the customer. In examples, the vehicle information comprises one or more of: the VIN number of the vehicle, the manufacturer of the vehicle, the model of the vehicle, and the year of the vehicle. Other examples are possible. In examples, the ranking information comprises one or more of: comfort performance of the tire (e.g., how comfortable is the ride provided by the tire), off-road performance (e.g., how does the tire perform off travelled roads), mileage performance (e.g., how well the tire performs in terms of providing acceptable gas mileage), winter performance (e.g., how well the tire performs in snow and ice), responsiveness performance (e.g., how well the tire responds to control by a driver as the vehicle is driven), and wet-road performance (e.g., how well the tire performs when the road surface is wet). Other examples are possible.

The search engine 142 is configured to: receive the vehicle information, map the vehicle information into a tire type, the tire type being compatible with the vehicle of the customer, create the first query for application to the first database and the second query for application to the second database. In aspects, the first query and the second query include the tire type, and the first query is customized to access the first database 106 via the first interface 120 and the second query is customized to access the second database 108 via the second interface 122. In examples, the search engine 142 may include information concerning the format of the first query and the format of the second query and maps the vehicle information received from the user device 102 into queries of the appropriate format. In examples, the tire type may be (or represent) a number, and alphanumeric string, a word or phrase, a brand name, a tire product name, a type of vehicle (e.g., car, SUV, truck, etc.), a vehicle or tire manufacturer, or combinations of these and other elements.

The first query is applied to the first database 106 by the search engine 142 and the second query is applied to the second database 108 by the search engine 142 (both through the respective interfaces 120 and 122). The application of the first query returns first results to the search engine 142 and application of the second query returns second results to the search engine 142. The results indicate whether a tire line (e.g., brand name) in the database matches the tire type in the query. The first results and second results are merged by the search engine 142 into overall results and the overall results are sent to the recommendation engine 140. For example, the merged results which tires may apply, be associated with, be compatible with, and/or be a match with the tire type.

The recommendation engine 140 is configured to receive the ranking information from the user electronic device 102, sort the overall results received from the search engine 142 according to the ranking information to create ranked results, and transmit the ranked results to the user electronic device 102. The user electronic device 102 renders the ranked results on a display screen of the user electronic device 102.

In aspects, a further action is taken with respect to the ranked results. The further action being one or more of: ordering a tire using an electronic ordering system, instructing an automated vehicle 150 to retrieve a tire from a storeroom, or instructing a robot or human to install a tire on a vehicle in the store 103. It will be appreciated that when the automated vehicle 150 obtains a tire from a storeroom, it may maneuverer through the store 103. The automated vehicle 150 may include grips, arms, or levers to remove the tire from a storage shelf and place the tire on the automated vehicle for return to an area in the store where the tire can be installed on the vehicle of the customer. In examples, the automated vehicle 150 may be a drone or an automated ground vehicle.

When robots are used to install tire, it will be appreciated that the robots may have arms, levers, and tools that allow for the removal and replacement of vehicle tires. These functions may also be provided by employees of the store.

It will be appreciated that these actions allow for various elements to physically interact with the vehicle of the customer, changing the physical state of the vehicle (e.g., the state of its tires).

The third database 110 includes tire pressure monitoring system (TPMS) data relating vehicle types to TPMS-related products (e.g., TPMS service packs), wherein the employee enters tire pressure monitoring system (TPMS) business rules at the user electronic device. In aspects, the third database 110 includes only TPMS information. The TPMS business rules are applied to data in the third database 110 by the recommendation engine to create a mapping between vehicle types and part numbers (or other identifiers) the TPMS-related products (e.g., TPMS service packs). The vehicle information is applied to the mapping to obtain a single TPMS-related product (part number) suitable for the vehicle of the customer (or, in some cases, a small group of possible products such as three or less).

In other aspects, pre-inspection of the vehicles may be performed. For example, an attendant or employee may take or move a portable electronic device (e.g., a tablet computer or smartphone) around the periphery of the vehicle and photos (or other types of images or sensed information) of the vehicle obtained. The portable electronic device includes a camera or other sensor (or sensors), which obtains the photos. These photos may be analyzed either automatically or manually to determine if damage to the vehicle (or components of the vehicle) exists before tire-changing operations are performed. In other examples, cameras or other sensors from fixed locations (e.g., in the service area where the tires are going to be changed) may be used. In still other examples, combinations of fixed and portable electronic devices with various sensors may be used to obtain the photos or other sensed information.

In examples, image analysis software may be used to determine vehicle damage (or vehicle part or component damage) information. This damage may include dents, scratches, or other abrasions to the body of the vehicle. It may also include an analysis that determines that components of the vehicle are not operating properly, have visible damage, and/or may be in need of repair or replacement. For instance, the image analysis may determine part of the vehicle (e.g., windshield wiper blades or windshields) where damage to a component exists, where the component is not operable, and/or where the component may need to be replaced/repaired.

The analysis may produce results that can be used for various purposes. For example, the images can be stored for future use in the event a customer claims the service shop inflicted or caused the damage on the vehicle, but where the damage, in fact, occurred before the vehicle entered the service area. Such evidence may be used to contradict such claims in legal or other proceedings or situations. In another example, the information may be used to suggest other services and/or products to the customer. For example, when the analysis indicates that the windshield wiper blades of the customer's vehicle are in poor condition (e.g., portions of the blades are detached or missing), then an automatic suggestion may be made to the customer that the blades should be replaced and that the shop can replace the blades. For example, the attendant can make this suggestion (after the suggestion is made on an electronic device of the attendant). Alternatively, the information can be sent (e.g., by email) to the customer. In another example, the information can be displayed on a screen visible to both the customer and the attendant/employee.

In still other aspects, many of the functions performed or described herein are performed by a computer application ("app") and a calendar or calendar function can be used in the app to schedule appointments. Various information, e.g., time of appointment, length of appointment, etc., can be included in the calendar to schedule appointments. In examples, the application and calendar can be accessed by the customer, employees of the service center, or both.

In aspects, the TPMS-related product (e.g., TPMS service packs) is related to a valve stem and/or a TPMS sensor. In other aspects, the user electronic device 102 renders information concerning the single TPMS-related product (e.g., TPMS service packs) on a display screen on the user electronic device 102. A further action is taken with respect to the single TPMS-related product (e.g., TPMS service packs), and the further action is one or more of: ordering the single TPMS-related product using the electronic ordering system, instructing the automated vehicle 150 to retrieve the single TPMS-related product (e.g., TPMS service packs) from a storeroom, or instructing a robot or human to install the single TPMS-related product (e.g., TPMS service packs) on the vehicle of the customers. It will be appreciated that these actions allow for various elements to physically interact with the vehicle of the customer, changing the physical state of the vehicle (e.g., the state of its tires).

Figure 2:
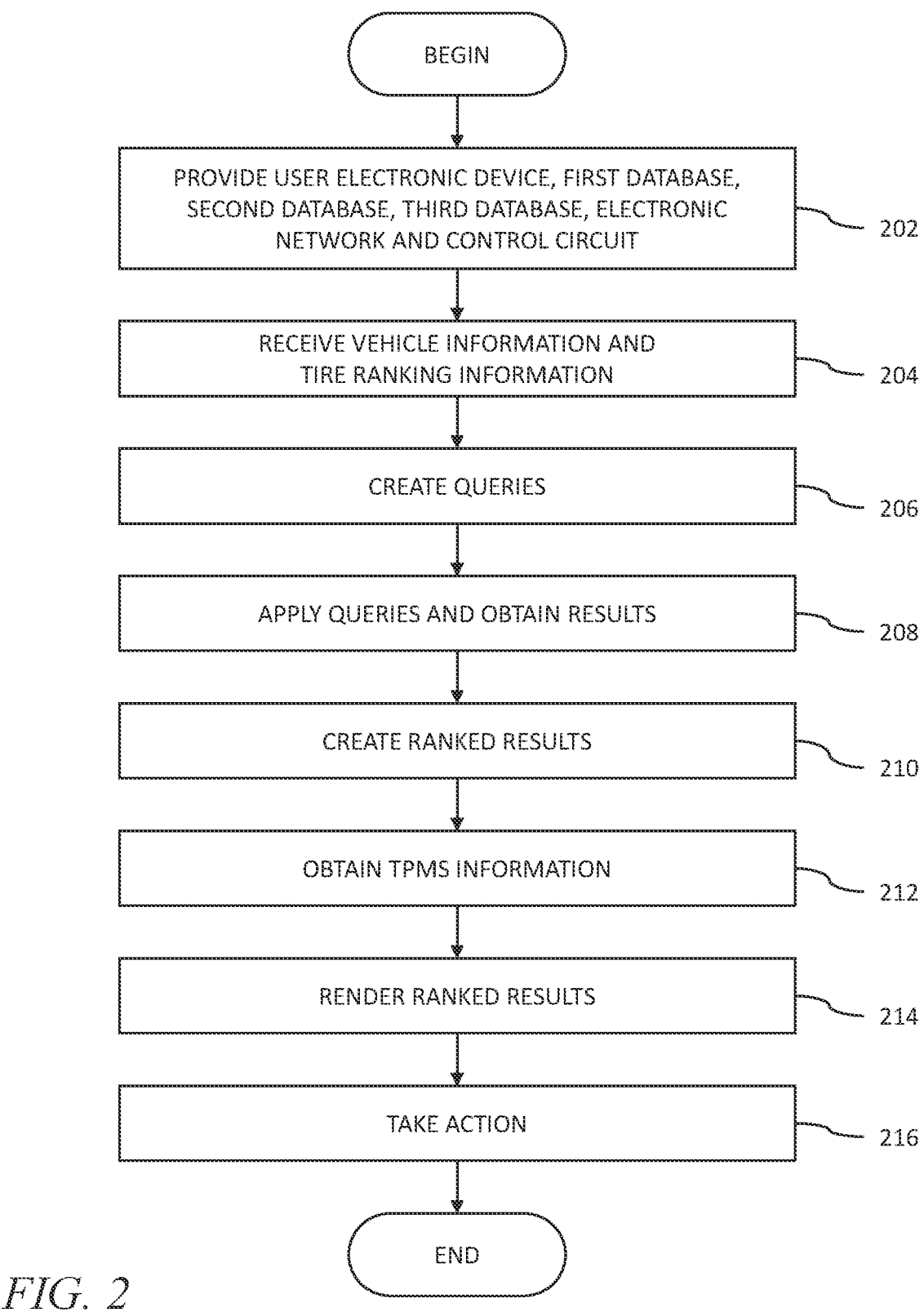
FIG. 2 comprises a flowchart as configured in accordance with various embodiments of these teachings.

Referring now to FIG. 2, one example of an approach for making tire recommendations to customers in a retail store is described. At step 202, a user electronic device, electronic network, first database, second database, and control circuit are provided. The user electronic device is operated in a retail store by an employee of the retail store. In other examples, the electronic device may be operated by a customer in the store. In still other examples, the user electronic device is not in the store, but may be in another location outside of the store such as the customer's home (e.g., the customer is utilizing the internet).

The first database is accessible by a first query made according to a first interface and using first security credentials. The first database is coupled to the electronic network, and a second data base. The second database is accessible by a second query made according to a second interface and using second security credentials. The second database is coupled to the electronic network. The first interface and the second interface are different and not compatible, and the first security credentials and the second security credentials are different and not compatible. The control circuit is configured to execute a search engine and execute a recommendation engine.

At step 204 and at the user electronic device, vehicle information and tire ranking information from a customer relating to a vehicle of the customer are received. The vehicle information may include a VIN number, a vehicle manufacturer (of the customer's vehicle), or other types of information that directly or indirectly is used to identify a tire type of the customer's vehicle. The tire ranking information may include the relative importance attached by the customer to various criteria. The relative importance may identify a most important factors, other factors of importance, and/or factors of no importance to the customer. For instance, the customer may attach most importance to wet road performance by the tire and no importance to other factors. In other aspects, the customer may provide or enter a numerically ranked list (e.g., first to last) of factors. Other examples of rankings are possible.

At step 206 and at the search engine, the vehicle information is received, and the vehicle information is mapped to a tire type. In aspects, a mapping or look-up table can be used where information in one column of the table is mapped into information in other columns of the table. The tire type is compatible with the vehicle of the customer. The first query for application to the first database and the second query for application to the second database are then created. The first query and the second query include the tire type. The first query is customized to access the first database and the second query is customized to access the second database. In some aspects, customization means creating a query that is recognizable and acceptable (e.g., in the correct format) to a particular database.

At step 208 and at the search engine, the first query is applied to the first database and the second query is applied to the second database. Application of the first query returns first results to the search engine and application of the second query returns second results to the search engine and wherein the first results and second results are merged by the search engine into overall results and the overall results are sent to the recommendation engine. The merged results represent an overall list of all results obtained from all databases that are accessed.

At step 210 and at the recommendation engine, the ranking information is received from the user electronic device, the overall results received from the search engine are sorted according to the ranking information to create ranked results, and the ranked results are transmitted to the user electronic device.

At step 212, TPMS service pack information (e.g., part number or other identifier) is obtained by applying vehicle information (e.g., a VIN number or vehicle type) to a database that maps the vehicle data to a single (or two number) of TPMS service packs (e.g., including valve stems and/or TPMS sensors).

At step 214 and at the user electronic device, the ranked results are rendered on a display screen of the user electronic device.

At step 216, a further action is taken with respect to the ranked results. The further action is one or more of: ordering a tire using an electronic ordering system, instructing an automated vehicle to retrieve a tire from a storeroom, or instructing a robot or human to install a tire on a vehicle. Other examples of actions are possible.

Figure 3B:
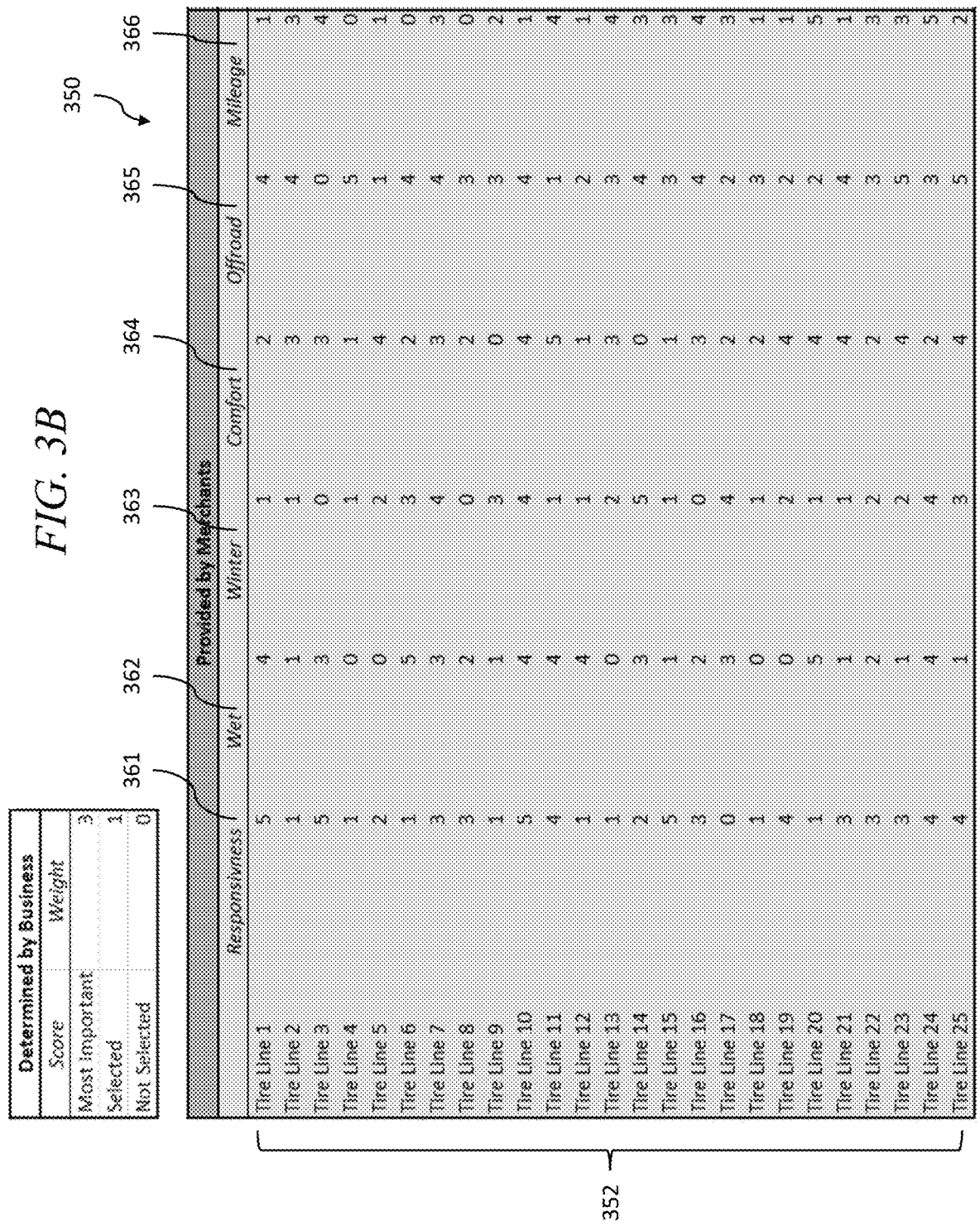

Referring now to FIG. 3A and FIG. 3B, one example of determining a recommendation list is described. FIG. 3A illustrates a ranked recommendation table 300 and FIG. 3B illustrates a ranking table 350.

The ranked recommendation table 300 shows, for a particular user, a ranked recommendation of tire lines, brands, and/or types. The ranking table 350 shows a score made and entered by, for example, employees or management personnel, for factors for each of multiple tire lines. Rows 352 each represent a tire line and each column 361 (responsiveness), 362 (wet road handling), 363 (winter driving handling), 364 (conform office), 365 (offload handling), and 366 (mileage performance) are characteristics. Each characteristic is scored by an employee for a particular tire line. The score may be an integer value of 1 to 5 with 5 being represent excellent and 0 representing poor. Thus, a score of 5 for winter driving handling means the tire rates or scores (by the employee) excellent in terms of winter handling ability or performance. The employee may enter the score value into the table 350 and the score may be based upon person opinion, instructions from supervisors, results of surveys, test results, or combinations of these or other factors.

The customer selects characteristics that are "most important' (a single characteristic), are merely "selected" as being somewhat important, or not selected at all. "Most important"

is given a weight of 3, "selected" is given a weight of 1, and "not selected" is given a weight of 0. It will be appreciated that these rankings are one example of possible rankings and that other types of rankings are possible.

For each tire brand (row) in table 350, the score of each characteristic is multiplied by the importance weight attached to the characteristic by a particular customer, and these products summed to obtain a score.

In table 300, the customer has selected wet driving 302 as the most important characteristic, while responsiveness 301 has been selected, winter 303 is not selected, comfort 304 is selected, offload 305 not selected, and mileage 306 is selected. Thus, the weights are: wet driving (302)=3, responsiveness (301)=1, winter (303)=0, comfort (304)=1, offload (305)=0, and mileage (306)=1. These are applied to each row of table 350 to obtain a total weighted score for each row. For the first row (tire line 1), 5*1+4*3+1*0+2*1+4*0+1*1=20. This is done for each row of the table 350. Then, the rows are rearranged in ranked order (highest total to lowest total) to produce the table 300. It can be seen that in table 300, tire line 11 and tire line 20 have the highest total scores (of 25) as shown in column 307 of the table 300. The top entries in table 300 (e.g., the top five entries) can be presented to the customer as recommendations. Other information (e.g., dimensions, pricing, discounts, or TPMS pack or product) can also be displayed to the customer.

Figure 4:
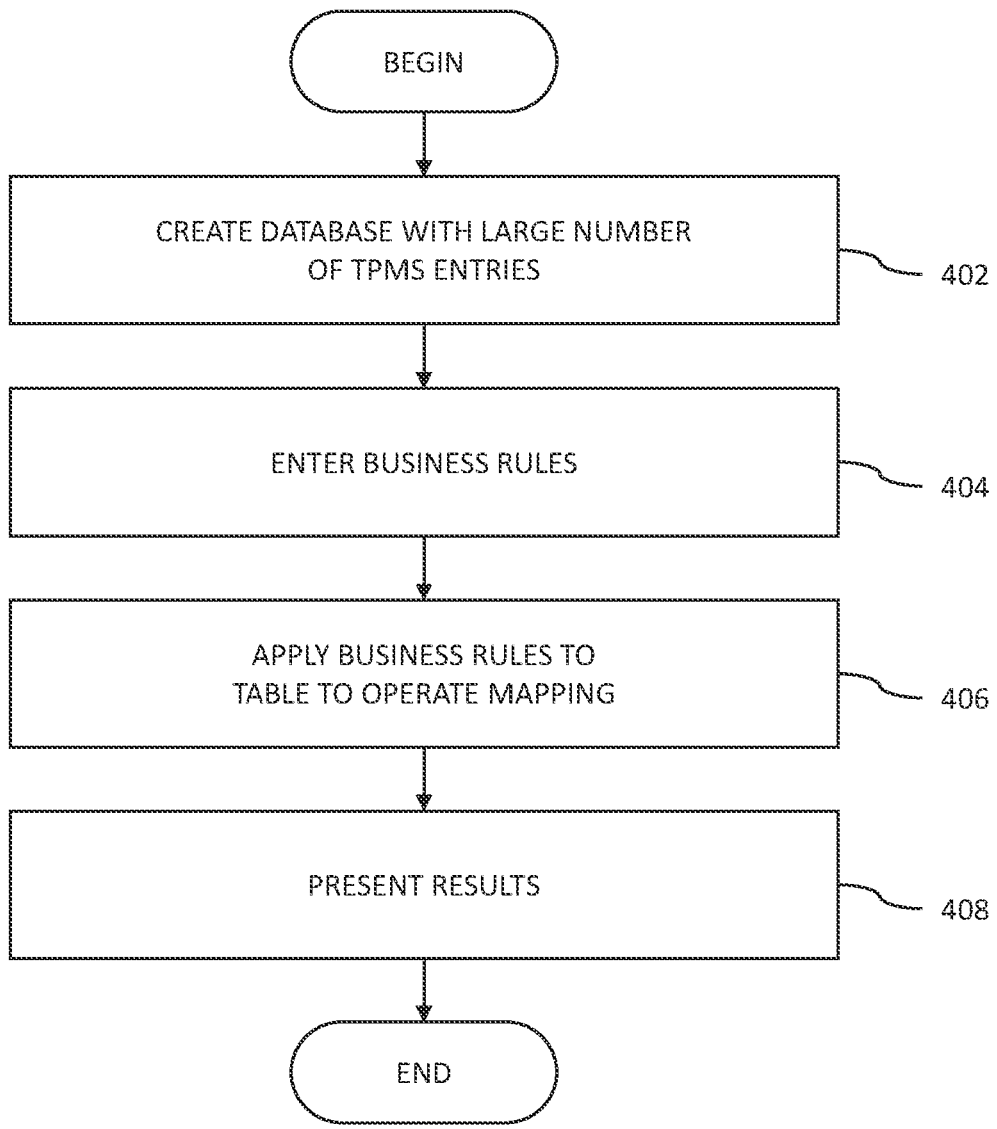
FIG. 4 comprises a diagram of aspects of a system as configured in accordance with various embodiments of these teachings.

Referring now to FIG. 4, one example of determine a TPMS set (e.g., valve stem pack) is described. This information can be displayed along with tire recommendations to customers.

At step 402, a large database is created having a large number (e.g., tens of thousands) of entries. The entries list information concerning TPMS packs and information associated with these packs (e.g., whether the pack is sold at a particular retail store, the cost of the pack, the type of vehicle tires or vehicles (e.g., brand or manufacturer) that can use the pack, whether the pack is for a programmable TPMS sensor or a non-programmable sensor). The information can be included in any data structure, for example, a table with various fields. There are, for example, more than 450 vehicle types and the large amount of information in the table does not allow the mapping of a single VIN number to a single TPMS pack.

At step 404, business rules are entered, for example, by a store employee or management personnel. The business rules are rules designed to filter the large number of entries in the table created at step 402 to a smaller number and so that a single VIN number (or other information) may be mapped to a single TPMS service pack recommendation. In examples, the business rules include whether the pack is sold at a particular retail store, the cost of the pack, the type of vehicle tires or vehicles (e.g., brand or manufacturer) that can use the pack, or whether the service pack is for a programmable TPMS sensor or a non-programmable sensor. Other examples are possible.

At step 406, the business rules are applied to the table reducing the table to a mapping. Consequently, a single VIN number (or other vehicle identifier) is mapped to an identifier or part number of a single TPMS service pack (or a low number of TPMS service packs). If the mapping produces multiple possible TPMS service packs, then an employee may assist the customer to narrow the possible TPMS service packs.

At step 408, the information may be presented to the customer. In examples, this may be displayed with other tire recommendation information that is rendered to the customer as has been described elsewhere herein.

Figure 5:
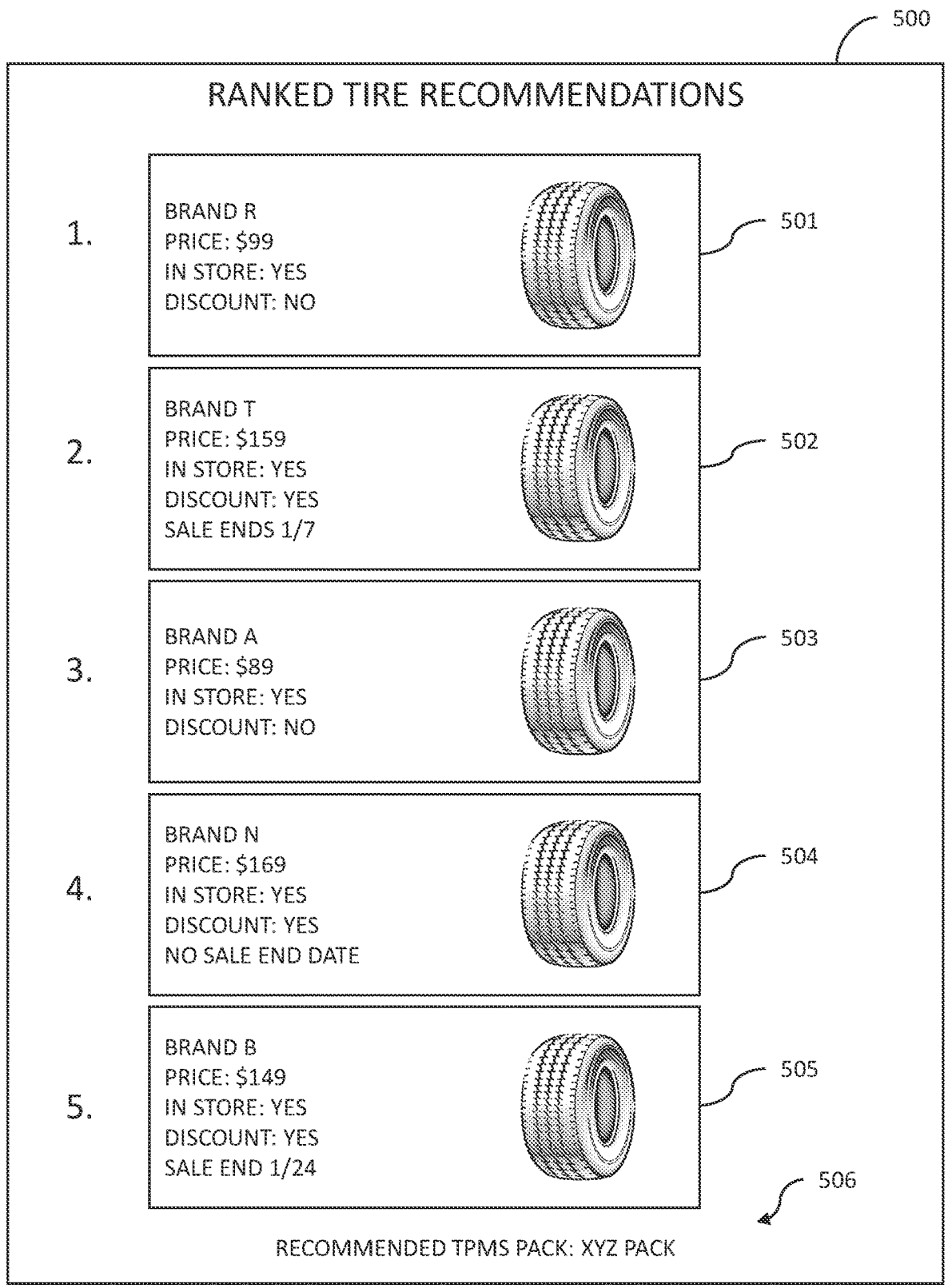
FIG. 5 comprises a diagram of aspects of a system as configured in accordance with various embodiments of these teachings.

Referring now to FIG. 5, one example of a display 500 to a customer is described. This can be displayed to the customer after the ranked recommendation list and/or the TPMS service pack recommendation are determined.

The display 500 includes the top 5 recommendations (in ranked order from first to fifth) illustrated in areas 501, 502, 503, 504 and 505. The recommendation areas 501, 502, 503, 504 and 505 may include a price, whether the tire is available at the store, or any discounts (sales) currently in force. Photos, other illustrations, and other information can also be provided. An area 506 is used to display TPMS service pack information recommended for the customer. The TPMS service pack recommendation may apply to all the tire recommendations, but in other examples, a separate recommendation is made for each tire type (since the TPMS service pack may be different). Other types of information (e.g., photos) may also be shown with the TPMS service pack recommendation.

Figure 6:
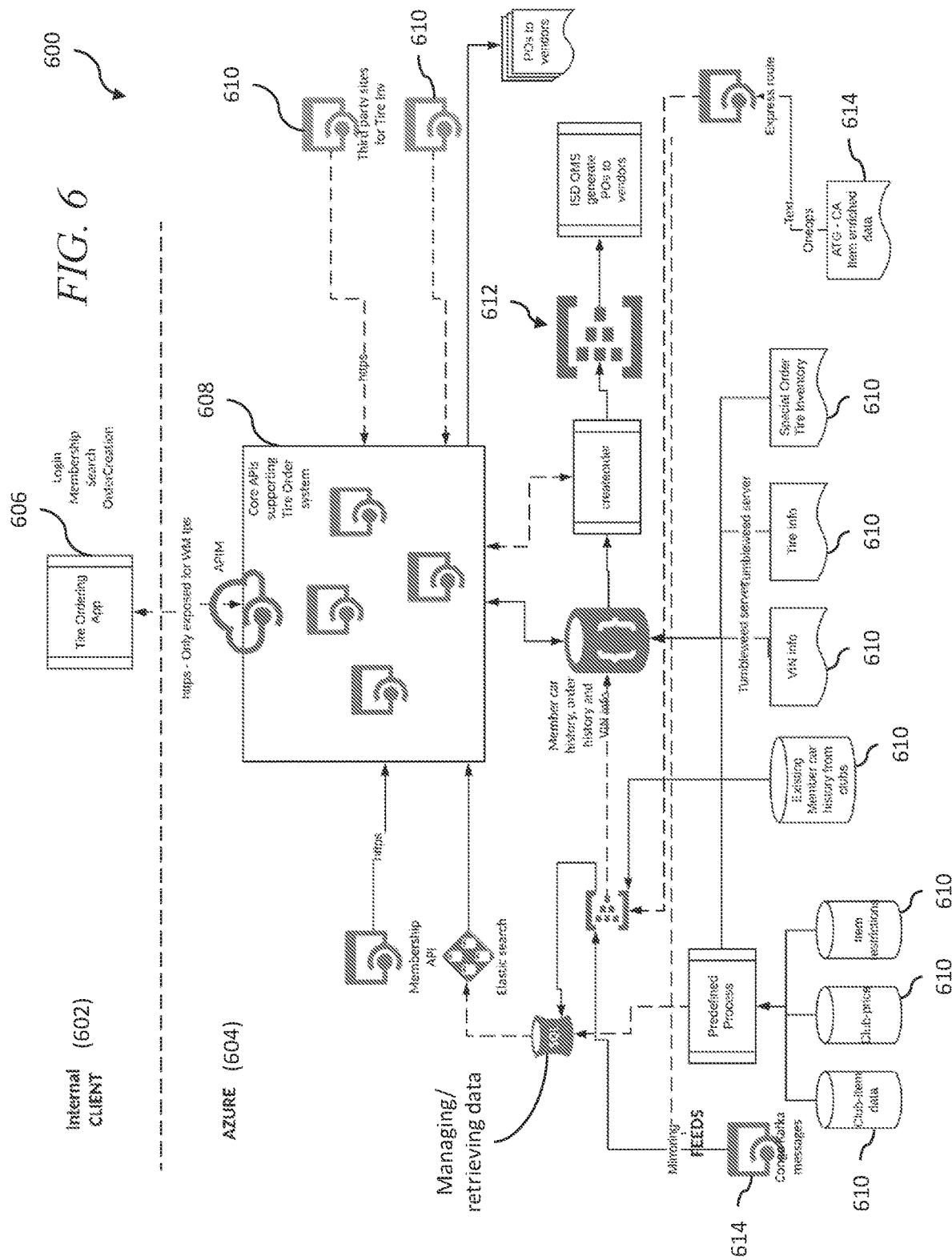
FIG. 6 comprises a diagram of aspects of a system as configured in accordance with various embodiments of these teachings.

Referring now to FIG. 6, one implementation of the approaches described herein is described. A system 600 includes an internal client portion 602 (implemented at an electronic device at a retail store) and an Azure™ platform portion 604 (e.g., disposed at the cloud).

The internal client portion 602 includes a tire ordering application 606 allowing a customer or store employee (for a customer) enter vehicle data and receive recommendations as has been described elsewhere herein.

The Azure™ platform portion 604 includes core application programming interfaces 608 (e.g., implemented as computer instructions) that implement, for example, the functions of the search and recommendation engines described herein. The Azure™ platform portion 604 also includes databases (or other structures) 610 that store, for example, tire information, price data, item data, item restriction, member (customer) history (e.g., purchase, service, or repair history), VIN information, tire information, and special-order tire inventory information. Tire orders 612 can be created and sent to vendors. Messages (or other textual information) 614 can be created and stored.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A system, the system comprising:
a first database, the first database accessible by a first query made according to a first interface, the first database coupled to an electronic network;
a second data base, the second database accessible by a second query made according to a second interface, the second database coupled to the electronic network;
wherein the first interface and the second interface are different and not compatible;
a control circuit coupled to the electronic network, the first database and the second database, the control circuit being configured to:
receive vehicle information and map the vehicle information into a tire type;
create the first query for application to the first database and the second query for application to the second database, the first query and the second query including the tire type, the first query being customized to access the first database and the second query being customized to access the second database;

apply the first query to the first database via the first interface and apply the second query to the second database via the second interface, and wherein application of the first query returns first results to the control circuit and application of the second query returns second results to the control circuit; and merge the first results and second results into overall results.

2. The system of claim 1, wherein the control circuit is further configured to receive tire ranking information, sort the overall results according to the tire ranking information to create ranked results, and transmit the ranked results to a user electronic device.

3. The system of claim 2, wherein the tire ranking information comprises one or more of: comfort performance, off-road performance, mileage performance, winter performance, responsiveness performance, and wet-road performance.

4. The system of claim 1, wherein an action is taken with respect to the overall results, the action being one or more of: ordering a tire using an electronic ordering system, instructing an automated vehicle to retrieve a tire from a storeroom, or instructing a robot or human to install a tire on a vehicle.

5. The system of claim 1, further comprising a third database, the third database including tire pressure monitoring system (TPMS) data relating vehicle types to TPMS-related products, wherein an employee enters tire pressure monitoring system (TPMS) business rules at a user electronic device, wherein the TPMS business rules are applied to data in the third database by the control circuit to create a mapping between vehicle types and the TPMS-related products, and wherein the vehicle information is applied to the mapping to obtain a part number of a single TPMS-related product suitable for a vehicle of the customer.

6. The system of claim 5, wherein the user electronic device renders information concerning the single TPMS-related product on a display screen on the user electronic device, and wherein a further action is taken with respect to the single TPMS-related product, the further action being one or more of: ordering the single TPMS-related product using the electronic ordering system, instructing an automated vehicle to retrieve the single TPMS-related product from a storeroom, or instructing a robot or human to install the single TPMS-related product on the vehicle.

7. The system of claim 1, wherein the vehicle information comprises one or more of: the VIN number of a vehicle, the manufacturer of the vehicle, the model of the vehicle, and the year of the vehicle.

8. The system of claim 1, wherein the first interface and the second interface relate to requirements to one or more of: query formatting, query content, query length, and query timing.

9. The system of claim 1, further comprising a sensor, the sensor being moved about a perimeter of a vehicle prior to the vehicle being serviced, the sensor obtaining images that are used to determine whether the vehicle has pre-existing damage prior to being serviced.

10. The system of claim 9, wherein the sensor is a camera in a portable electronic device carried by an employee about the perimeter of the vehicle.

11. A system, the system comprising:

providing a first database, the first database accessible by a first query made according to a first interface, the first database coupled to an electronic network;

providing a second data base, the second database accessible by a second query made according to a second interface, the second database coupled to the electronic network;

wherein the first interface and the second interface are different and not compatible;

a control circuit coupled to the electronic network, the first database and the second database, the control circuit being configured to:

at a control circuit, receiving vehicle information and map the vehicle information into a tire type;

at the control circuit, creating the first query for application to the first database and the second query for application to the second database, the first query and the second query including the tire type, the first query being customized to access the first database and the second query being customized to access the second database;

at the control circuit, applying the first query to the first database via the first interface and apply the second query to the second database via the second interface, and wherein application of the first query returns first results to the control circuit and application of the second query returns second results to the control circuit;

at the control circuit, merging the first results and second results into overall results.

12. The method of claim 11, further comprising at the control circuit receiving tire ranking information, sorting the overall results according to the tire ranking information to create ranked results, and transmitting the ranked results to a user electronic device.

13. The method of claim 12, wherein the tire ranking information comprises one or more of: comfort performance, off-road performance, mileage performance, winter performance, responsiveness performance, and wet-road performance.

14. The method of claim 11, wherein an action is taken with respect to the overall results, the action being one or more of: ordering a tire using an electronic ordering system, instructing an automated vehicle to retrieve a tire from a storeroom, or instructing a robot or human to install a tire on a vehicle.

15. The method of claim 11, further comprising providing a third database, the third database including tire pressure monitoring system (TPMS) data relating vehicle types to TPMS-related products, wherein an employee enters tire pressure monitoring system (TPMS) business rules at a user electronic device, wherein the TPMS business rules are applied to data in the third database by the control circuit to create a mapping between vehicle types and the TPMS-related products, and wherein the vehicle information is applied to the mapping to obtain a part number of a single TPMS-related product suitable for a vehicle of the customer.

16. The method of claim 15, wherein the user electronic device renders information concerning the single TPMS-related product on a display screen on the user electronic device, and wherein a further action is taken with respect to the single TPMS-related product, the further action being one or more of: ordering the single TPMS-related product using the electronic ordering system, instructing an automated vehicle to retrieve the single TPMS-related product from a storeroom, or instructing a robot or human to install the single TPMS-related product on the vehicle.

17. The method of claim 11, wherein the vehicle information comprises one or more of: the VIN number of a vehicle, the manufacturer of the vehicle, the model of the vehicle, and the year of the vehicle.

18. The method of claim 11, wherein the first interface and the second interface relate to requirements to one or more of: query formatting, query content, query length, and query timing.

19. The method of claim 11, further comprising providing a sensor, the sensor being moved about a perimeter of a vehicle prior to the vehicle being serviced, the sensor obtaining images that are used to determine whether the vehicle has pre-existing damage prior to being serviced.

20. The method of claim 19, wherein the sensor is a camera in a portable electronic device carried by an employee about the perimeter of the vehicle.

* * * * *